(12) United States Patent
Koehler

(10) Patent No.: US 7,916,290 B2
(45) Date of Patent: Mar. 29, 2011

(54) COAXIALLY ARRANGED, OFF-AXIS OPTICAL SYSTEM FOR A SIGHTING DEVICE OR AIMING DEVICE

(75) Inventor: Albrecht Koehler, Jena (DE)

(73) Assignee: Analytik Jena AG, Jena (DE)

( * ) Notice: Subject to any disclaimer, the term of this patent is extended or adjusted under 35 U.S.C. 154(b) by 30 days.

(21) Appl. No.: 12/569,052

(22) Filed: Sep. 29, 2009

(65) Prior Publication Data
US 2010/0079750 A1    Apr. 1, 2010

(30) Foreign Application Priority Data
Sep. 30, 2008  (DE) .......... 10 2008 049 882

(51) Int. Cl.
*G02B 23/10* (2006.01)
*G02B 17/00* (2006.01)
*F41G 1/00* (2006.01)

(52) U.S. Cl. ........ 356/251; 356/247; 356/248; 356/252; 356/253; 359/726; 359/801; 359/809; 359/819; 42/111; 42/115; 42/134; 42/135; 434/19

(58) Field of Classification Search .......... 359/726, 359/718, 798–801, 809, 819; 42/111, 115, 42/134, 135; 356/247, 248, 251–253; 434/19; 89/200
See application file for complete search history.

(56) References Cited

U.S. PATENT DOCUMENTS

| 3,963,356 A | 6/1976 | Wiklund |
| 4,346,995 A | 8/1982 | Morris |
| 5,189,555 A | 2/1993 | Jorlov |
| 5,440,387 A | 8/1995 | Montelin et al. |
| 5,594,584 A | 1/1997 | Kay et al. |
| 5,724,181 A * | 3/1998 | Negishi .......... 359/428 |
| 6,327,806 B1 | 12/2001 | Paige |

FOREIGN PATENT DOCUMENTS

| DE | 24 62 506 A1 | 9/1977 |
| DE | 298 22 897 U1 | 6/1999 |
| DE | 20 2006 004 574 U1 | 6/2006 |
| EP | 1 182 419 A2 | 2/2002 |

* cited by examiner

*Primary Examiner* — Evelyn A. Lester
(74) *Attorney, Agent, or Firm* — Duane Morris LLP

(57) ABSTRACT

The invention is directed to a coaxially arranged, off-axis optical system for a sighting device or aiming device. It is the object of the invention to provide a possibility for constructing an optical system in such a way that the typical disadvantage with respect to the tightness of a sighting device in an open-type construction is overcome and a good flattening of the image field is achieved in addition to the high optical imaging quality of the aiming mark. According to the invention, by means of a coaxially arranged, off-axis optical system for a sighting device or aiming device comprising a lens group, wherein the lens facing the target object is constructed as a converging meniscus and the lens facing the eye is constructed as a diverging meniscus, with a dichroic reflector and an embodiment for the aiming mark, the above-stated object is met in that a correction lens with positive refractive power is arranged at a distance of less than 0.2-times the focal length relative to the aiming mark and acts exclusively in the beam path of the aiming mark, and in that the correction lens is inserted into the housing by positive locking and is sealed so that the housing with the aiming mark, with the associated mechanism and with the electronics in the interior is sealed relative to the environment.

4 Claims, 5 Drawing Sheets

COAXIALLY ARRANGED, OFF-AXIS OPTICAL SYSTEM FOR A SIGHTING DEVICE OR AIMING DEVICE

FIELD OF THE INVENTION

The invention is directed to a coaxially arranged, off-axis optical system for a sighting device or aiming device.

BACKGROUND OF THE INVENTION

Reflex sights work on the principle that an aiming mark, usually a dot, is imaged at infinity by a concave mirror. Owing to the fact that this concave mirror is constructed as a semi-transparent mirror, it simultaneously opens up the view to the target. The target and aiming mark must be acquired without accommodation of the eye through an appropriate design of the general system.

Typically, these devices are virtually non-magnifying aiming devices which are outfitted with a virtual luminous mark imaged at infinity. Therefore, the names red dot sight or collimator sight are also commonly used for these devices.

A substantial advantage of reflex sights over telescopic sights consists in that there is no system-dependent predetermined distance between the sight and the eye for their use. This distance can be a few centimeters but can also be greater than a meter without affecting function. Since there is only a slight magnification, if any, sighting can also be carried out with both eyes open. This allows for good observation of the target field.

In most of these devices, the luminous dot, which is preferably red, is generated by a light emitting diode. The size of the light emitting diode and the focal length of the collimating optics determine the apparent size of the luminous dot. To obtain a luminous dot with only a small target coverage, either a long focal length or a very small dot size must be selected. A long focal length means a correspondingly large device.

A compact construction requires that the focal length is relatively small and that the aperture is comparatively large. The focal length for these compact sighting devices is in the range of 25 mm.

Therefore, the diameter of the luminous dot for a small dot size for the class of compact sights under discussion is 50 µm or less.

With respect to the collimating optics used for this purpose, it must be ensured that the view is not optically modified on the one hand and that the luminous dot is imaged at infinity on the other hand. This is achieved by means of a partially reflective layer on the concave lens surface facing the observer, while the other side of the lens is adapted in such a way that the optics have no refractive power.

There are various embodiment forms of this optical system for achieving a high-quality imaging of the dot and an unaltered viewing image. In the simplest instance, a tilted lens is used. However, it is usually necessary to use off-axis segments. Also, the optical imaging quality can be improved even further by aspherical surfaces. Such aspherical surfaces are formed, for example, as thin plastic layers with a glass lens as supporting medium. These are known as replica optics. Further, there are systems which are composed of a plurality of lenses or which contain cover plates in addition.

In terms of the construction of the optics, there is either a tubular constructional shape with lenses or cover plates at each end or an open constructional shape with a freestanding lens or lens group. The open construction has proven successful for compact sights in particular. It offers a large field of view because the optics are enclosed only by a narrow rim, and there is no tube. These devices are usually not watertight, but rather water-resistant or spray-resistant. On the other hand, the tube type construction is more robust, substantially larger and, therefore, also heavier. Another disadvantage of this constructional type is the limited visual angle. They can also have a slight magnification so that the visual angle is further reduced. The focus of application is military, where robustness and tightness are particularly important. Sights in a tubular constructional form are disclosed, for example, in European Patent EP 1 182 419 B1 and U.S. Pat. Nos. 5,189,555 A and 5,440,387 A, in which the aiming mark is arranged inside two delimiting optical component parts.

An important quality feature of reflex sights is the parallax compensation of the aiming mark. Absence of parallax means that the image of the aiming mark and the targeted object lie in a plane. This prevents the aiming mark from moving in front of the object when the sighting device is looked through off-center.

In order to achieve minimal parallax errors, the higher-quality sighting devices are factory set at a parallax-free observation distance of, e.g., 40 m or 100 m.

Devices of this type have an elevation adjustment and lateral adjustment to bring the position of the sighting dot and the impact point into alignment with one another. This adjustment should function in two orthogonal axes with as little play as possible and must not affect the parallax adjustment. Apart from the mechanical precision, the stability of the parallax compensation over the entire adjustment range is also critically influenced by the flattening of the image field of the collimating optics.

Sighting devices in which luminous aiming marks are reflected in are typically constructed from a convex-concave lens, the concave surface being reflective and facing the eye. The lens is constructed in such a way that it has no, or only a slight, optical power with ray passage in a straight line. Also, only one lens section is typically used so that a corresponding centric arrangement of the aiming mark is possible without obstructing the image field and sighting window. A representative arrangement is described in U.S. Pat. No. 4,346,995.

There are also other differences in these sighting devices with respect to the alignment of the optical axis of these systems in relation to the viewing direction. In sighting devices in which the optical system is tilted relative to the observation direction, the wedge effect causes a ray deflection which allows the object to appear in a different direction. As is shown in U.S. Pat. No. 5,594,584 A, the effort to eliminate this ray deflection leads to two-part lens systems in which the lenses are displaced relative to one another. However, de-centered systems of this kind have substantial flaws in imaging quality from the start.

PRIOR ART

U.S. Pat. No. 3,963,356 discloses a variant in which the optical system of the reflex sight comprises two component parts, the reflective layer being located on the inner side. It is also shown that an off-axis lens segment is used in which a light emitting diode is situated in the focal point of the spherical mirror and that the optical axis and the observation axis are parallel to one another. A construction of this kind makes possible a better optical correction than the arrangement described above and ensures the desired parallelism of the optical axes for observation with or without sighting device.

An embodiment form of a reflex sight that is often applied uses only one individual convex-concave lens in which the light proceeding from the aiming mark is reflected on the concave side. This optical-reflective imaging is easy to control and there is only one optically active surface which is also not influenced by dispersion. However, the disadvantage in using only one spherical surface is that not all of the rays proceeding from the aiming mark will be imaged at infinity. This image error is caused by the spherical aberration of a spherically shaped lens surface. Since this type of sighting device should offer a large, manageable field of view, the lens segment is larger than is actually required. As a result, the system-dependent image errors are also increased. In particular, it is disadvantageous when the pupil of the eye is not on the optical axis formed by the sighting optics, but rather is shifted toward the edge within the sighting window. The spherical aberration gives rise to the effect whereby the image of the aiming mark appears at a distinctly different distance than the target object. In connection with the off-axis view through the sight, this results in an aiming error, referred to as a parallax error, caused by the different distances of the observation object and the image of the aiming mark. The parallax manifests itself in that, depending on the position of the eye in relation to the optical axis, a different target point is perceived although the position of the aiming device itself has not changed. This error can also not be prevented by adjustments because the coincidence of the image plane and object plane on the optical axis is already produced. However, it is possible for this parallax error to be increased even further by insufficient adjustment of the position of the aiming mark.

A solution to this problem which is based on the use of a parabolic reflection surface instead of the spherical surface as reflective surface is described in U.S. Pat. No. 5,440,387. As is generally well known, all of the rays proceeding from the focal point of a parabola are ideally reflected as a parallel light bundle. However, in order to minimize or eliminate the influence on the direct ray path from the sighted object through the optical component to the eye, the entry surface must also be constructed in a corresponding manner and, as is explained in this reference, must be elliptically or hyperbolically shaped. However, producing optical components of this kind with the required quality by conventional lens technologies is very uneconomical so that it is necessary to resort to injection-molded plastics.

This also applies in an analogous sense to the use of optics produced by the replica method, as is also shown in U.S. Pat. No. 6,327,806 B1. In this case, the aspherical outer contour is formed of plastics materials.

Under robust and rugged use, however, lenses made from plastic, as opposed to glass, have disadvantages such as lower resistance to scratching and poor resistance to solvents and cleaning agents. Also, depending upon the material, the component may warp when penetrated by water and, therefore, in the worst cases, the geometry crucial to the optical imaging may be altered. The applied layers may remedy this disadvantage conditionally. Also, it is particularly disadvantageous that the functionally important splitter layer is external and, therefore, with intensive use over a longer period of time, is highly vulnerable mechanically to the cleaning steps by themselves.

A considerable disadvantage consists in that the very good correction state achieved by a paraboloid only applies to a punctiform aiming mark which is positioned exactly on the optical axis. There is an appreciable drop over the image field. This ideal state is not achieved as a result of the elevation of the aiming mark and the canting of the lens for purposes of aligning the sighting device on the weapon.

In the German Utility Model DE 298 22 897 U1, these problems are solved in that the optical system comprises two spherical lenses which are cemented together and can advantageously be fabricated by conventional means. The reflection of the ray proceeding from the aiming mark takes place on the inner sides of the lenses. There is no sealing of the beam path to the LED.

It is crucially important for the operation of a sighting device of this kind that parallax errors are prevented for a given object distance. This means that the aiming mark must be situated exactly in the plane in which the image of the object is generated. This can be ensured by alignment. However, in view of the fact that a vertical and lateral adjustment of the aiming mark is required for making the sighting point and the impact point coincide, this condition should also be met when the aiming mark is not situated exactly on the optical axis but rather on any point within the field. However, there is a considerable variation in quality of imaging of the various optical systems for reflect sights and the assurance, for example, that this criterion is met varies widely in terms of quality.

OBJECTS OF THE INVENTION

It is an object of the invention to provide a possibility for constructing an optical system in such a way that the typical disadvantage with respect to the tightness of a sighting device in an open-type construction is overcome and a good flattening of the image field is achieved in addition to the high optical imaging quality of the aiming mark.

According to an aspect of the invention, by means of a coaxially arranged, off-axis optical system for a sighting device or aiming device comprising a lens group, wherein the lens facing the target object is constructed as a converging meniscus and the lens facing the eye is constructed as a diverging meniscus, with a dichroic reflector and an embodiment for the aiming mark, the above-stated object is met in that a correction lens with positive refractive power is arranged at a distance of less than 0.2-times the focal length relative to the aiming mark and acts exclusively in the beam path of the aiming mark, and in that the correction lens is inserted into the housing by a positive locking and is sealed so that the housing with the aiming mark, with the associated mechanism and with the electronics in the interior is sealed relative to the environment.

Advantageous embodiments are indicated in the dependent claims.

BRIEF DESCRIPTION OF THE DRAWINGS

The invention will be described in more detail with reference to embodiment examples illustrated in the annexed drawings in which.

DESCRIPTION OF THE EMBODIMENTS

The correction diagrams show the ratios for the ×0.4, ×0.7 and ×0.9 image height in addition to the transverse aberration on the optical axis and at the image edge. As regards the assessment of quality, it is immaterial whether or not the ray tracing is carried out from the aiming mark toward infinity or, in reverse, from infinity toward the image plane. The ray direction is reversible and merely causes a mirroring of the curve shapes at the axes or a sign reversal. For purposes of a clearer depiction, the beam path for the image center is shown in the upper part of the graphic depiction of the beam path and the path for the outermost edge point is shown in the lower part. In real devices, usually only one side of the optics is provided.

Light sources emitting in the red region, chiefly light-emitting diodes, are often used as aiming marks. The wavelength region is relatively narrow-band. Therefore, the system is evaluated exclusively monochromatically.

Aside from the parallaxes, the spherical aberration and the field curvature are important criteria for the optical system of a reflex sight. Usually, a dot is imaged. On the return path, the rays must also reunite at a point. However, precisely these image errors are caused by the compact construction with a very high opening compared to the focal length. Therefore, a simple system with an individual spherical reflection surface cannot be used for high-quality systems.

The ratios are substantially improved through the use of a parabolic reflection surface. The spherical aberration and distortion are entirely eliminated. The only disadvantages are the appreciable field curvature and the parallaxes which are accordingly still present in the field.

Figure 1:
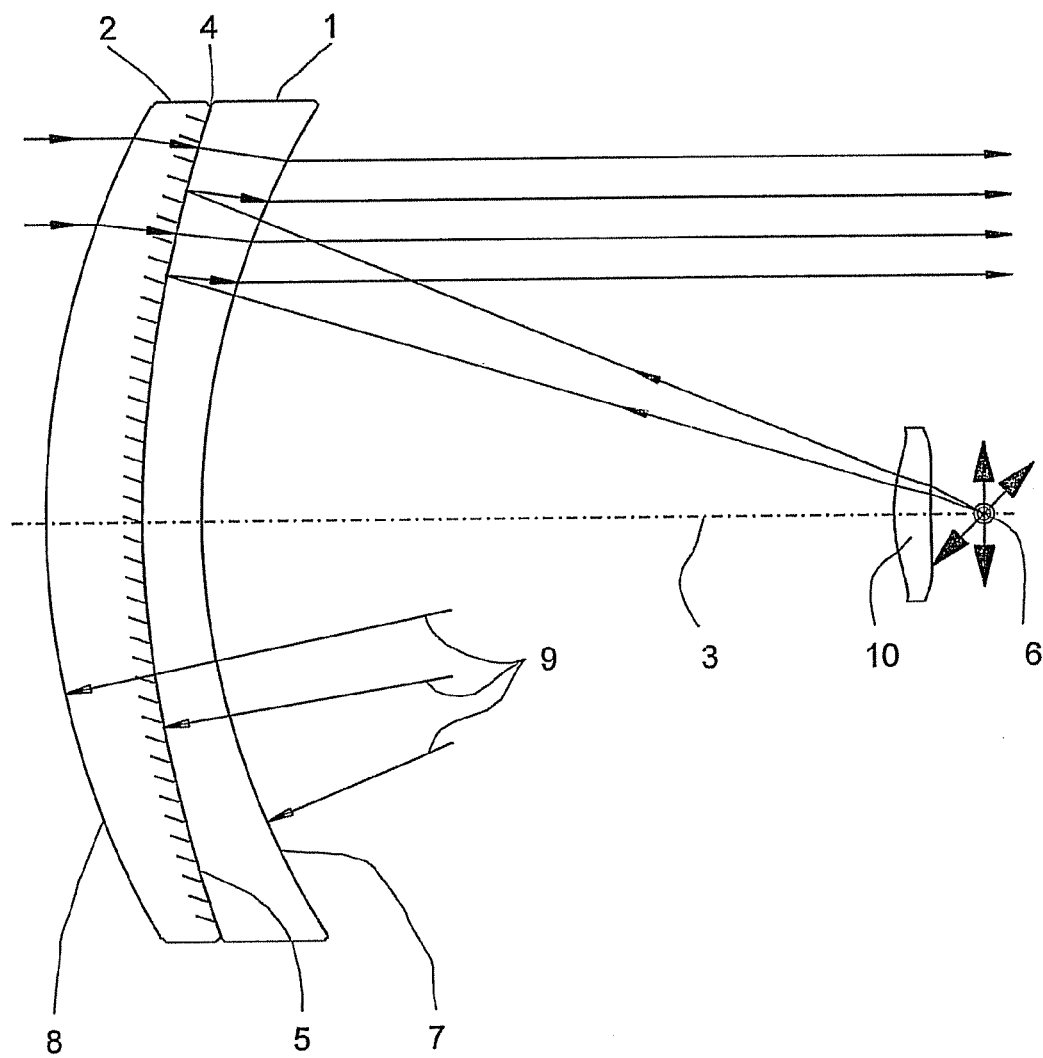
FIG. 1 is a section view through a lens system according to the invention with the illumination beam path and observation beam path.

In the embodiment form of a sighting device, described above, which is shown in FIG. 1, the light beam proceeding from the aiming mark 6 is initially refracted at a lens surface 7 after passing through the correction lens 10 before being reflected by the next lens surface 5. The path of the reflected beam is subsequently changed again through refraction at the above-mentioned glass/air surface. It is possible to achieve an imaging that is virtually free from parallax errors through suitable radii 9 relative to one another and suitable thickness of the lenses. Finally, the lens surface 8 facing the target object is constructed in such a way that an approximately afocal imaging results with negligible image errors. The correction lens 10 is arranged in spatial proximity to the aiming mark 6, but not in the traversing observation beam path.

Figure 2:
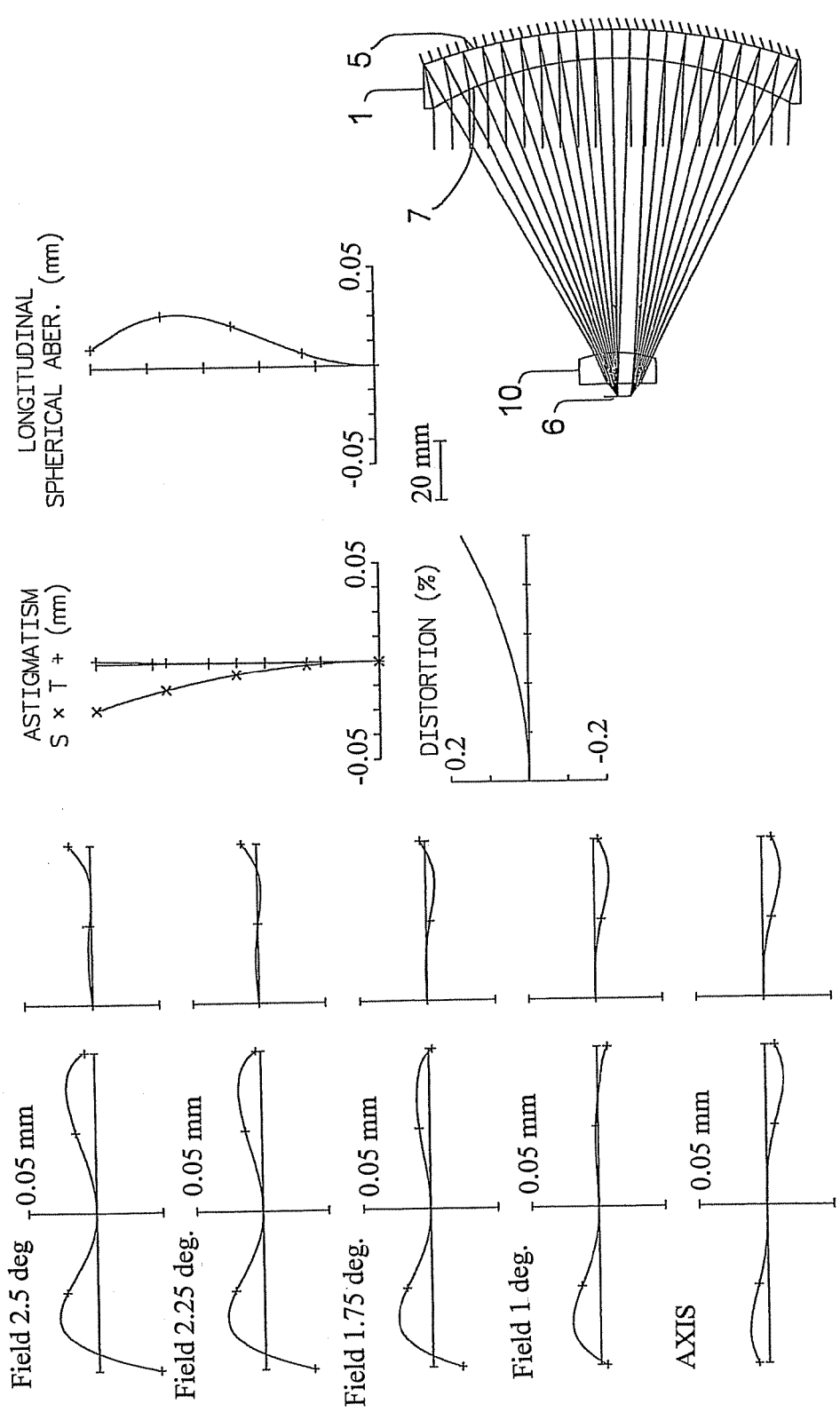
FIG. 2 is a correction diagram of a system according to the invention with a spherical correction lens at 100 mm focal length.
Figure 3:
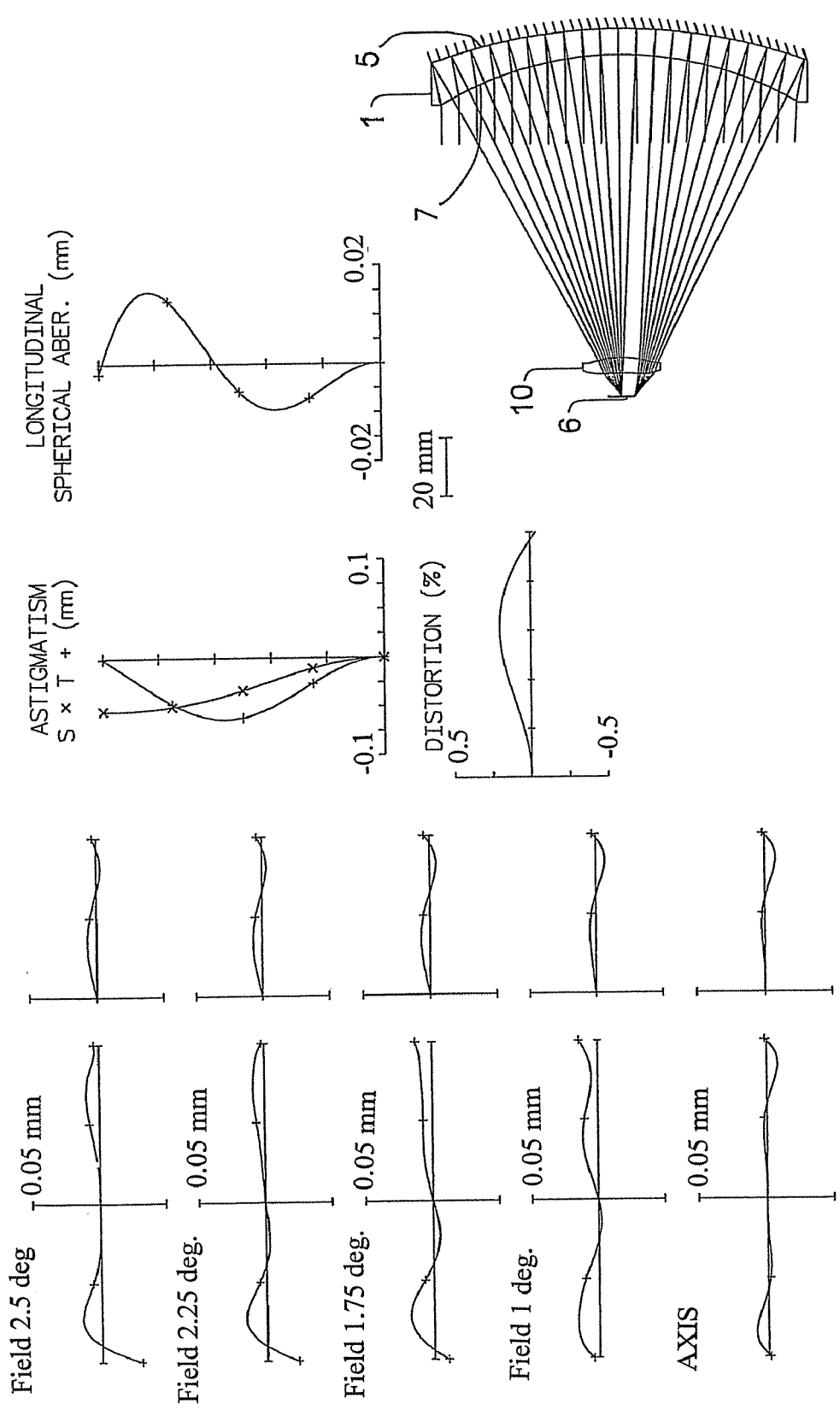
FIG. 3 is a correction diagram of a system according to the invention with a correction lens which is aspherical on both sides, at 100 mm focal length.
Figure 4:
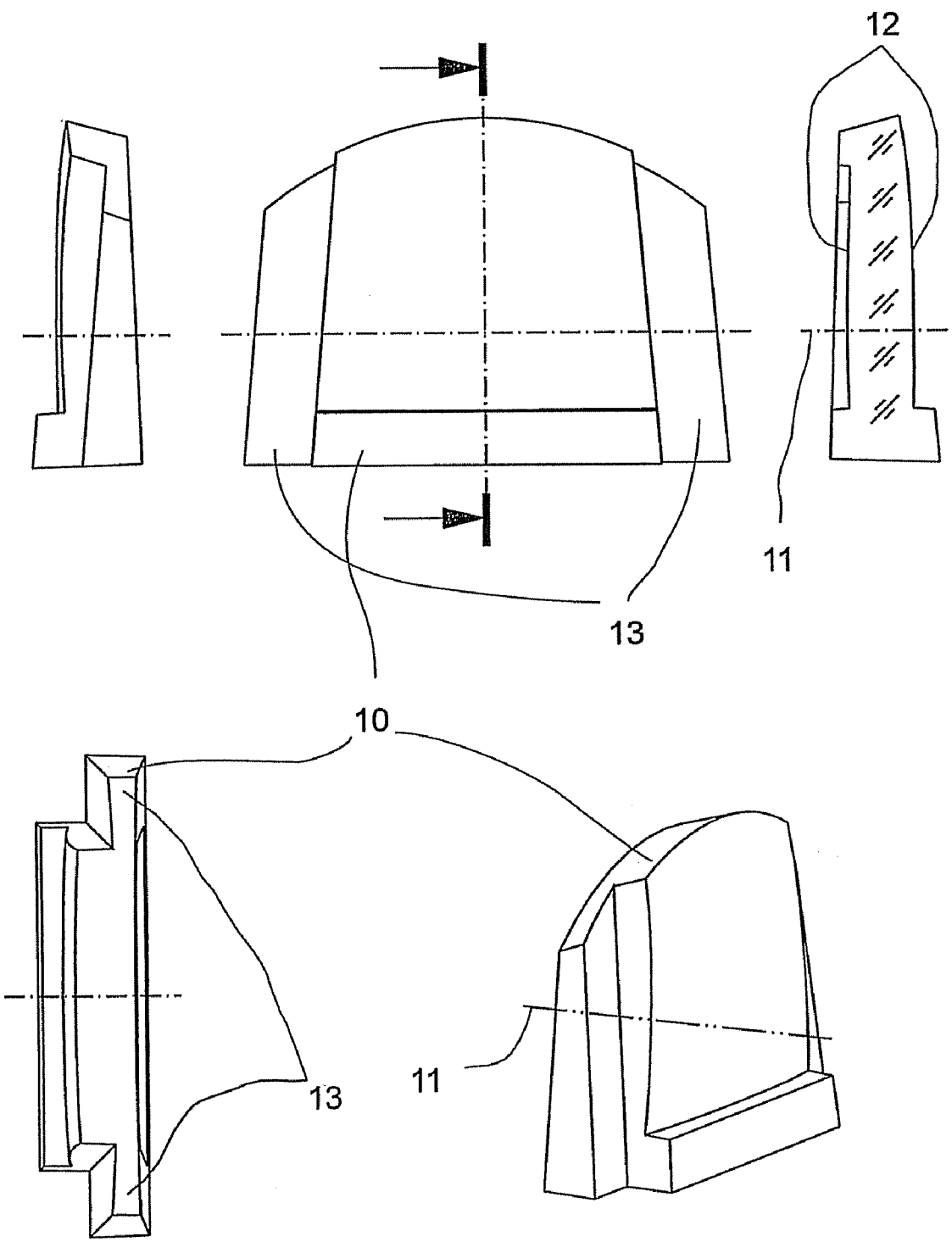
FIG. 4 is a correction lens according to the invention in several views.

As is shown in FIG. 2, very good results are already achieved when the correction lens 10 is a conventional spherical lens. A further improvement and optimization with respect to specific requirements can be carried out when one or both optically active surfaces 12 of the correction lens 10 are aspherical as is shown in FIG. 3. FIG. 4 shows several views of a correction lens 10 of this kind. An aspherical component of this kind can be used economically particularly when it is produced as a pressed blank or injection molded part.

The part of the optical system serving for reflection need only be corrected with respect to the wavelength of the light emitter, whereas the part which also serves for observation must be evaluated polychromatically. Therefore, glasses or plastics which are particularly suited to such production methods and which have favorable mechanical and thermal properties can be selected for the imaging beam path of the aiming mark 6.

An inexpensive and easily workable crown glass, for example, BK7, is most appropriate for the requirements of the observation beam path and, therefore, also the components used together with the imaging beam path of the aiming mark 6 because the resulting image errors of the system overall are relatively small because of the small optical effect. Both lenses can be made from the same material, but may also be made from different optically active materials. However, it is advantageous to avoid great differences in the refractive index between the glasses and also in relation to the optical cement which is used in order to prevent additional reflections at the interfaces.

The best results are achieved when the lens facing the eye (see FIG. 1 or FIG. 6) is formed as a meniscus-shaped diverging lens 1 having a partially reflective coating on the joining surface 4 regardless of whether or not the spectral characteristics of this coating have a uniform curve over the entire wavelength region or only a maximum in a certain portion of the visible spectrum. A second lens formed as a converging meniscus 2 is placed on this first lens.

The optical system is advisably divided along the optical axis 3 so that two lens sections are formed from one lens. In this way, the aiming mark 6 can be arranged on the optical axis 11 formed by the center of curvature. However, it is also possible to further reduce the edge of the lens and to give it a rectangular, oval or circular appearance, for example, without the function and the above-described advantages being influenced by this. This applies likewise to the correction lens 10.

Figure 5:
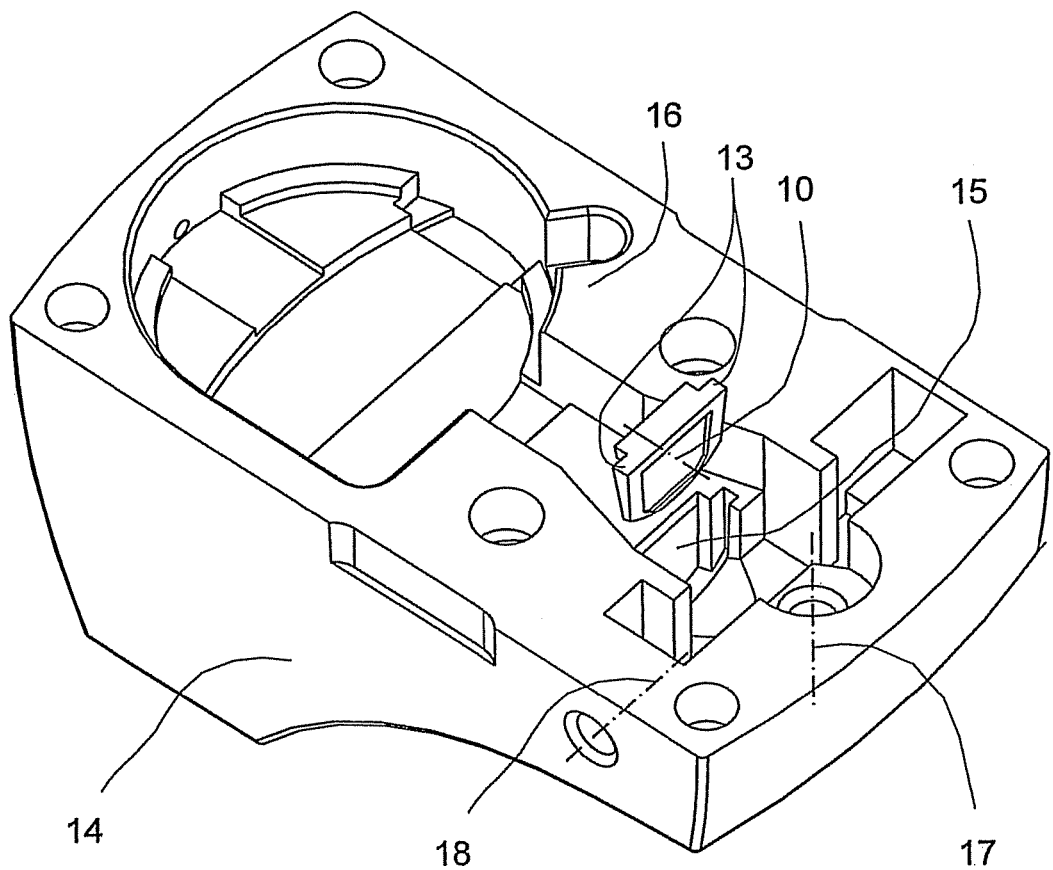
FIG. 5 illustrates a housing with an opening for receiving the correction lens according to the invention.
Figure 6:
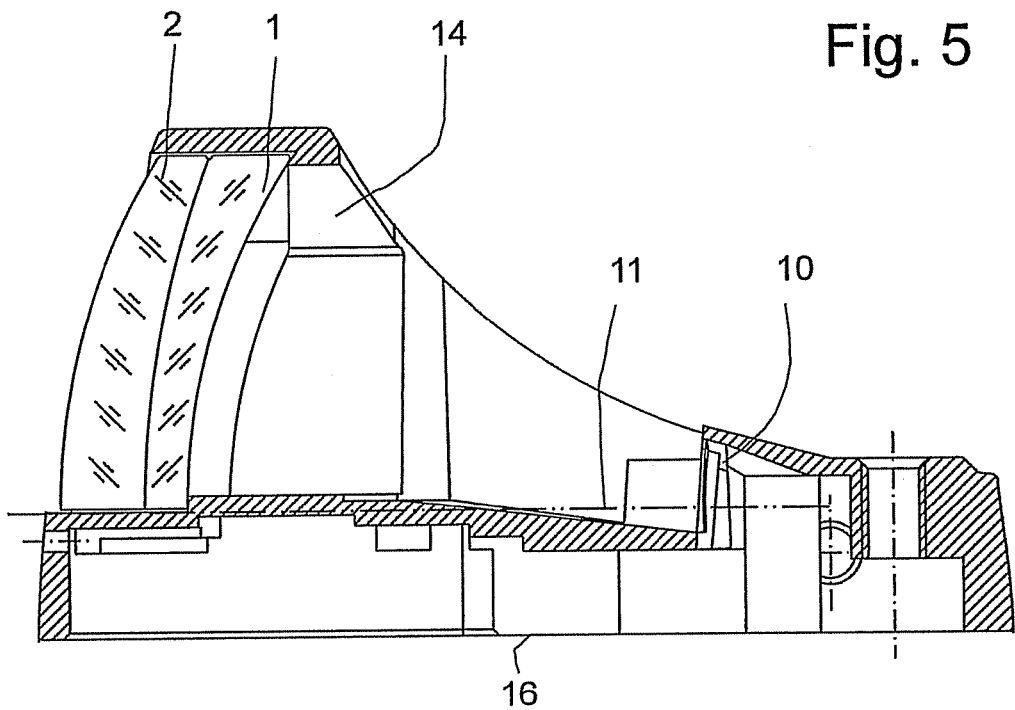
FIG. 6 is a section view along the optical axis through a housing with a lens system according to the invention.

Another important aspect is preventing water from penetrating into the interior of the sighting device because these devices are portable and are preferably used outdoors, sometimes under extreme climatic conditions. When used under field conditions, it is very possible for water or dust to reach the very small aiming mark 6 and impair, disrupt or completely prevent imaging. This influence is appreciably reduced by encapsulating the installation space between the correction lens 10 and the aiming mark 6 because the beam bundle is made substantially larger by the correction lens 10. A construction of this kind according to the invention is shown in FIG. 5 and FIG. 6. The correction lens 10 is limited to the necessary size, which is given by the adjustment area of the aiming mark 6 and the dimensions of the usable sight window of the reflection lens. Further, the correction lens 10 is provided with guide webs 13 by means of which it is inserted into the housing 14 with opening 15 by positive locking. The remaining joints are sealed with cement. The housing 14 is provided on the underside 16 with cutouts for receiving the electronics, not shown, the mechanism, also not shown, for aligning the aiming mark 6 (axis for adjustment in y-direction 17 and x-direction 18) and the aiming mark 6. Accordingly, this underside 16 can be well sealed against environmental influences after mounting on a suitable complementing piece.

A sighting device constructed in this way is highly robust.

The inventive solution can also be carried out in a corresponding manner for use in closed tubular systems.

| Reference Numbers | |
|---|---|
| 1 | meniscus-shaped diverging lens |
| 2 | converging meniscus |
| 3 | optical axis |
| 4 | joining surface |
| 5 | lens surface |
| 6 | aiming mark |
| 7 | lens surface |
| 8 | lens surface |
| 9 | radius |
| 10 | correction lens |
| 11 | optical axis |
| 12 | optically active surface |
| 13 | guide web |
| 14 | housing |
| 15 | opening |

-continued

| Reference Numbers | |
|---|---|
| 16 | underside |
| 17 | axis for the adjustment in y-direction |
| 18 | axis for the adjustment in x-direction |

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. Coaxially arranged, off-axis optical system for a sighting device or aiming device comprising a lens group, wherein the lens facing the target object is constructed as a converging meniscus and the lens facing the eye is constructed as a diverging meniscus, with a dichroic reflector and an embodiment for an aiming mark, wherein a correction lens with positive refractive power is arranged at a distance of less than 0.2-times the focal length relative to the aiming mark and acts exclusively in the beam path of the aiming mark, and in that the correction lens is inserted into a housing by positive locking and is sealed so that the housing with the aiming mark, with the associated mechanism, and with the electronics in the interior is sealed relative to the environment.

2. The optical system according to claim 1, wherein the correction lens has spherical surfaces.

3. The optical system according to claim 1, wherein one or both optically active surfaces of the correction lens are aspherical.

4. The optical system according to claim 1, wherein the correction lens is produced by primary shaping.

* * * * *